US006654266B2

(12) United States Patent
Kalvelage et al.

(10) Patent No.: US 6,654,266 B2
(45) Date of Patent: Nov. 25, 2003

(54) SELECTABLE ARRANGEMENT ENERGY CONVERTER

(75) Inventors: Gérard Kalvelage, Civray de Touraine (FR); Philippe Aubin, Parçay Meslay (FR)

(73) Assignee: Faiveley Transport, Saint Denis (FR)

( * ) Notice: Subject to any disclaimer, the term of this patent is extended or adjusted under 35 U.S.C. 154(b) by 0 days.

(21) Appl. No.: 10/067,521

(22) Filed: Feb. 5, 2002

(65) Prior Publication Data

US 2002/0126511 A1 Sep. 12, 2002

(30) Foreign Application Priority Data

| Feb. 5, 2001 | (FR) | ............................................. 01 01508 |
| Mar. 6, 2001 | (FR) | ............................................. 01 03037 |
| Jun. 12, 2001 | (FR) | ............................................. 01 07681 |

(51) Int. Cl.[7] ................................................ H02M 7/00
(52) U.S. Cl. .......................................... 363/71; 363/68
(58) Field of Search .............................. 363/71, 65, 67, 363/68, 69, 70, 89, 132, 127

(56) References Cited

U.S. PATENT DOCUMENTS

| 3,419,786 | A | | 12/1968 | Brane | |
| 4,339,704 | A | | 7/1982 | McSparran et al. | |
| 5,008,795 | A | * | 4/1991 | Parsley et al. | ................. 363/20 |
| 6,373,732 | B1 | * | 4/2002 | Patel et al. | ..................... 363/72 |
| 6,388,904 | B2 | * | 5/2002 | Nomura | ........................ 363/71 |
| 6,411,527 | B1 | * | 6/2002 | Reinold | ........................ 363/17 |

FOREIGN PATENT DOCUMENTS

WO    WO 97/38479    10/1997

* cited by examiner

Primary Examiner—Shawn Riley
(74) Attorney, Agent, or Firm—Knobbe Martens Olson & Bear LLP

(57) ABSTRACT

An electric energy converter comprises N transformers each including a primary winding and a secondary winding, a primary circuit connected to two input terminals on which the primary windings of the transformers are connected, a secondary circuit connected to two output terminals on which the secondary windings of the transformers are connected. Each primary and secondary circuit includes a set of switching devices connected to N primary windings and N secondary windings, where the converter further comprises a controller configured to control the switching devices of at least one of the primary or secondary circuits, the switching devices being connected to associate the N primary or secondary windings in a series and/or parallel arrangement by using the controller.

13 Claims, 5 Drawing Sheets

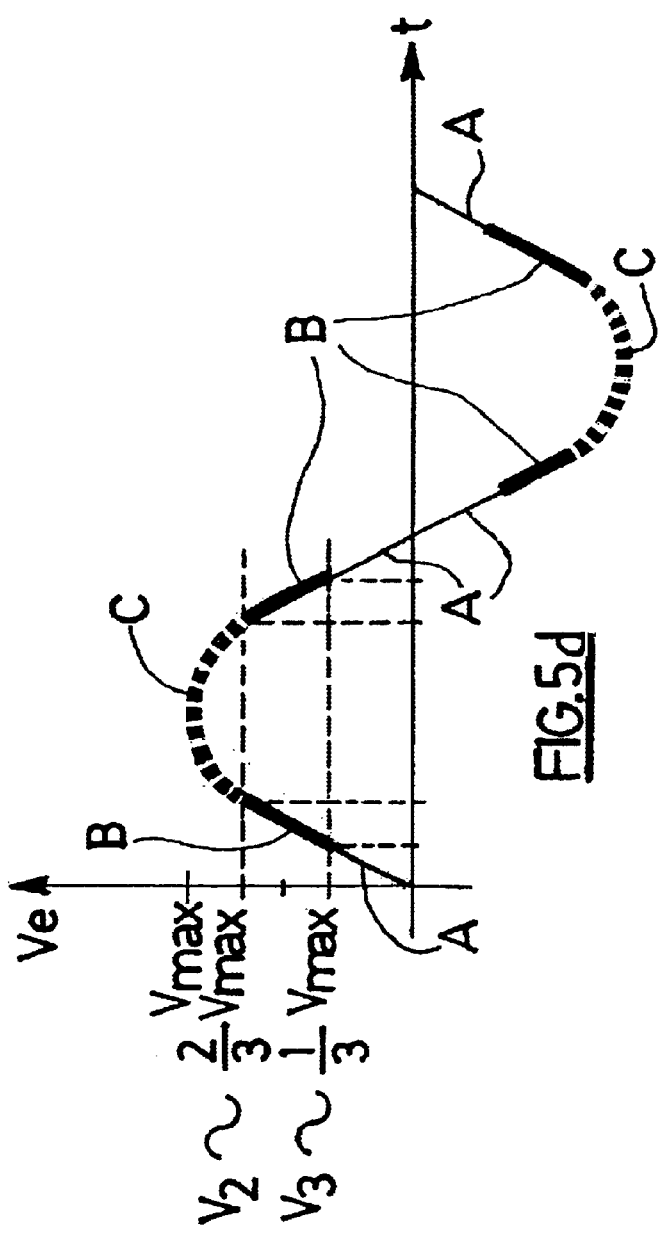
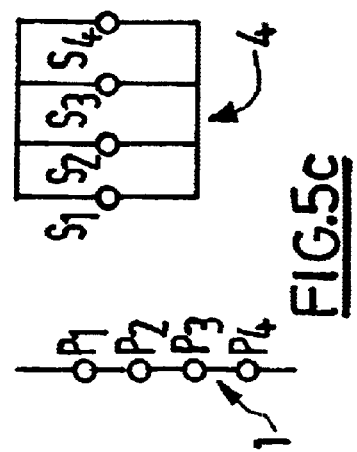
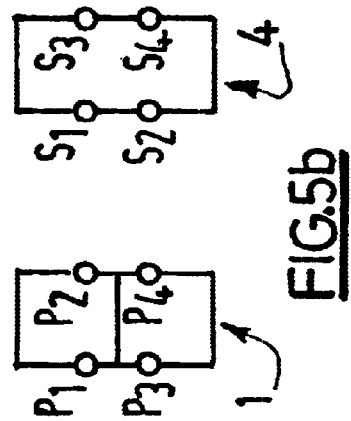
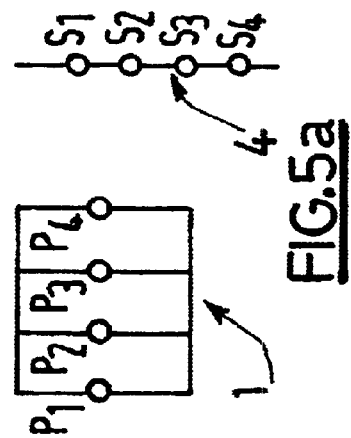
FIG.5a
FIG.5b
FIG.5c
FIG.5d

SELECTABLE ARRANGEMENT ENERGY CONVERTER

FIELD OF THE INVENTION

The invention concerns an electric energy converter associating in series and/or in parallel a plurality of transformers.

DESCRIPTION OF THE RELATED TECHNOLOGY

There already exist converters associating series or parallel transformers.

Thus, the documents U.S. Pat. Nos. 4,339,704 and 3,419,786 describe a converter including a primary winding and several secondary windings. The converter is fed by an a.c. voltage. The secondary windings are connected in parallel to two conductors, each conductor having diodes connected in series. Thus, the two conductors are interconnected between their respective diodes by a secondary winding The converter described in the document U.S. Pat. No. 3,419,786 includes on each conductor N+1 diodes for N secondary windings. In addition, it comprises N switches connected in series with each secondary winding.

The converter described in the document U.S. Pat. No. 4,339,704 includes on each conductor N+2 diodes connected in series, two diodes being placed between the successive secondary winding connections. N−1 switches connect the two conductors between two diodes connected successively in series.

These two converters make it possible to vary the output voltage by a factor N by associating the secondary windings in series or in parallel.

However, they have the drawback of requiring the use of a large number of switches and do not tolerate the tolerance to breakdowns of the primary circuit In addition, these converters cannot function with a d.c. input voltage and the range of variation of the output voltage remains limited.

SUMMARY OF CERTAIN INCENTIVE ASPECTS

The invention seeks to resolve these problems by using a converter of simple design needing a reduced number of switches yet making it possible to obtain an equal or greater output voltage variation range and by tolerating simple breakdowns.

Moreover, the converter of the invention can function with an a.c or d.c. output or input voltage.

To this effect, a first object of the invention concerns providing an electric energy converter including:
  N transformers each including one primary winding and one secondary winding,
  A primary circuit connected to two input terminals on which the primary windings of the transformers are connected,
  A secondary circuit connected to two output terminals on which the secondary windings of the transformers are connected.

This converter is characterised in that each primary or secondary circuit of the converter includes a set of switching means connected to N primary windings and to N secondary windings, and in that it includes means for controlling the switching means of at least one of the primary or secondary circuits, the switching means being connected so that it is possible to associate the N primary or secondary windings in series and/or in parallel by using the control means.

In a first variant, the primary circuit includes a current generator which feeds the input terminals and the secondary circuit includes a voltage generator connected in parallel to the output terminals.

In a second variant, the primary circuit includes a voltage generator connected in parallel onto the input terminals and the secondary circuit includes a current generator connected to the output terminals.

In one embodiment, each primary or secondary circuit can adopt one of the following two dual configurations:
  the first configuration includes two electric conductors connected in parallel between the input or output terminals, each conductor comprising at least N+1 series switching means, the two conductors being interconnected between their respective switching means by a primary or secondary winding,
  the second configuration includes N+1 electric conductors connected in parallel between the input or output terminals, each conductor comprising at least two series switching means, the conductors being interconnected two by two between their respective switching means by a primary or secondary winding.

Another object of the invention concerns a method for controlling a converter according to the invention in which the primary circuit has the first configuration This method includes stages consisting of moving a switching pattern successively along the pairs of switching means of the primary circuit and, for each pair of switching means, of subsequently inverting the state of one of the switching means of the pair or successively the state of the two switching means of the pair.

A pair of switching means then corresponds to two switching means connected before or after a given winding.

BRIEF DESCRIPTION OF THE DRAWINGS

Other objects and advantages shall appear during a reading of the following description with reference to the accompanying drawings given by way of non-restrictive examples on which:

FIG. 5d represents a curve of the time input voltage and FIGS. 5a, 5b and 5c diagrammatically represent the series and/or parallel connections adopted by the windings of the transformers according to the voltage represented on the curve of FIG. 5d;

DETAILED DESCRIPTION OF CERTAIN INVENTIVE METHODS

Figure 1:
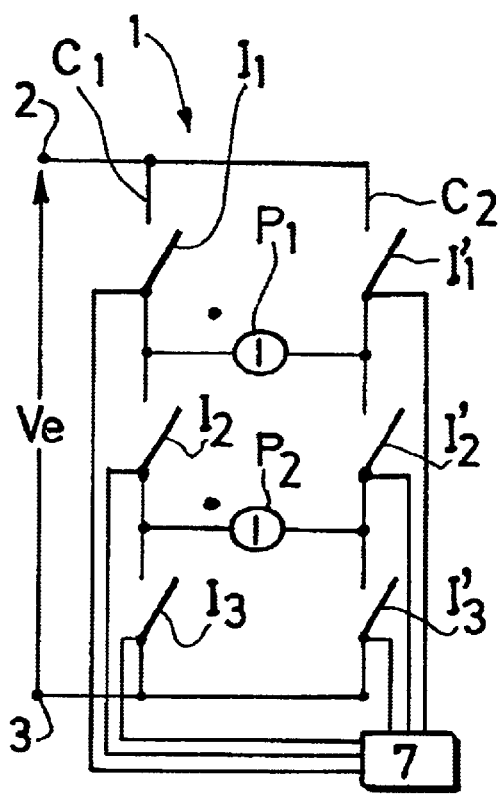
FIG. 1 shows a diagram of an embodiment of a converter according to the invention.
Figure 1:
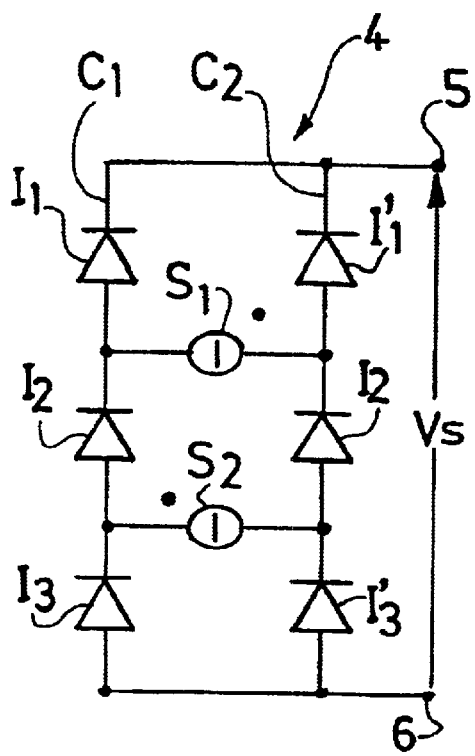

According to the invention, the electric energy converter includes:
  N transformers ($P_N$, $S_N$) each including one primary winding $P_N$ and one secondary winding $S_N$, N being a whole number,
  a primary circuit 1 connected to two input terminals 2, 3 on which the primary windings $P_N$ of the transformers are connected, a secondary circuit 4 connected to two output terminals 5, 6 on which the secondary windings $S_N$ of the transformers are connected.

Each primary 1 and secondary 4 circuit includes at least 2N+2 switching means $I_N$ and $I'_N$.

The converter also includes means 7 for controlling the switching means $I_N$ and $I'_N$ and at least one of the primary or secondary circuits, the switching means being connected so that it is possible to associate the N primary or secondary windings in series and/or in parallel by using the control means.

The control means 7 can control either solely the switching means of the primary circuit 1 or of the secondary circuit 4, or control both the switching means of the primary 1 and secondary 4 circuits.

The switching means $I_N$ and $I'_N$ make it possible to open and close the circuit to which they are connected.

These switching means can be unidirectional or bidirectional switches, such as diodes, IGSTs, thyristors, triacs, field effect transistors, bipolar transistors, contactors, contacts, GTOs, ICGTs, MOS or similar elements.

In a first variant, the primary circuit 1 includes a current generator which feeds the input terminals 2, 3. This involves for example a winding. The secondary circuit 4 then includes a voltage generator connected in parallel to the output terminals 5, 6. This for example involves a capacitor.

In a second variant, the primary circuit 1 includes a voltage generator (such as a capacitor) connected in parallel onto the input terminals 2, 3 and the secondary circuit 4 includes a current generator connected to the output terminals 5, 6 (such as a winding).

The primary 1 and secondary 4 circuits can adopt one of the two dual configurations described hereafter.

The first configuration is described with reference to FIG. 1 which represents a converter whose two primary 1 and secondary 4 circuits adopt this first configuration.

In the example shown, the converter includes N=2 transformers.

The primary 1 and secondary 4 circuits each respectively include two electric conductors $C_1$, $C_2$ connected in parallel between the input 2, 3 or output 5, 6 terminals.

Each conductor $C_1$, $C_2$ comprises N+1 series switches $I_N$ and $I'_N$ respectively.

The two conductors $C_1$, $C_2$ of the primary circuit are interconnected between their respective switches $I_N$ and $I'_N$ by a primary winding $P_N$. Thus, the primary windings $P_N$ are connected in parallel between the two conductors $C_1$, $C_2$.

Similarly, the two conductors $C_1$, $C_2$ of the secondary circuit are interconnected between their respective switches $I_N$ and $I'_N$ by a secondary winding $S_N$ so that the secondary windings $S_N$ are connected in parallel between the two conductors $C_1$, $C_2$.

In the embodiment shown on FIG. 1, the switches $I_N$ and $I'_N$ of the secondary circuit are diodes. All these diodes are connected in the same direction.

The points shown on FIGS. 1 to 4 at the level of the primary $P_N$ and secondary $S_N$ windings symbolise the direction of the windings.

Thus, on FIG. 1, the windings $P_2$, $S_2$ are in the same direction, whereas the windings $P_1$ and $S_1$ are in a direction opposite each other. This configuration makes it possible to obtain a branching in parallel of the windings of the secondary circuit when the windings of the primary circuit are in series and vice versa.

For a converter with N transformers, when the primary and secondary circuits have the same configuration, a winding on two of the secondary circuit is inverted with respect to the corresponding windings of the primary circuit.

The second configuration, dual of the first one, is described with reference to FIG. 2 which shows a converter whose primary circuit 1 has the first configuration and the secondary circuit 4 adopts this second configuration.

This duality between the two circuits involves the following properties:
when a switch is closed at the primary, the corresponding switch is open at the secondary and vice versa;
the voltage waveforms on the primary switches become the waveforms of the currents in the secondary switches and vice versa;
when the primary windings are connected in series, the secondary windings are connected in parallel and vice versa.

Figure 2:
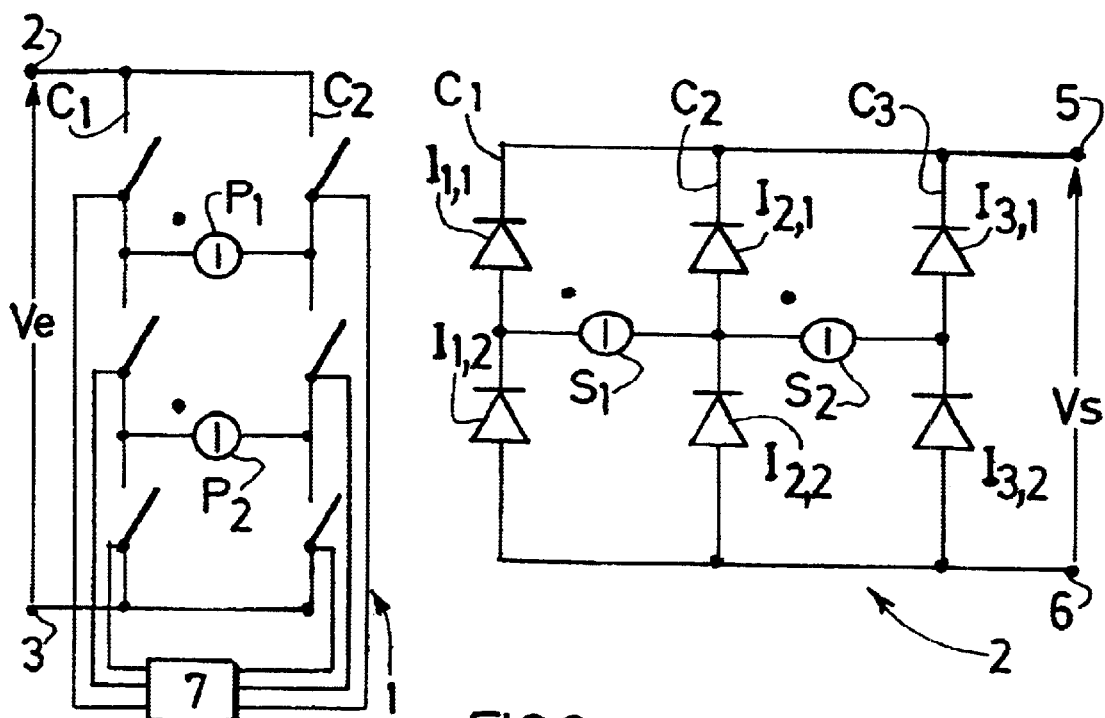
FIG. 2 is a diagram of a second embodiment of the invention.

In the example shown on FIG. 2, the converter includes N=2 transformers.

The primary circuit 1 is identical to the one shown on FIG. 1

The secondary circuit 4 includes N+1 electric conductors $C_N$ connected in parallel to the output terminals 5, 6 of the secondary circuit.

Each conductor $C_N$ of the secondary circuit comprises two switches $I_{N,1}$ and $I_{N,2}$ in series, the conductors $C_N$ being interconnected two-by-two between their respective switches by a secondary winding $S_N$.

In the embodiment shown on this figure, the switches $I_{N,1}$ and $I_{N,2}$ of the secondary circuit are diodes.

As the configurations of the primary 1 and secondary 4 circuits are dual with respect to each other, it is not necessary to invert the direction of a winding on two so as to obtain a branching in parallel of the windings of the secondary circuit when the windings of the primary circuit are in series, and vice versa.

Thus, the points symbolising the direction of the windings are all on the same side for the converter of FIG. 2.

For a converter with N transformers, when the primary and secondary circuits have dual configurations, all the windings are in the same direction.

So as to obtain some reversibility of the converter, it would be necessary to associate the switches in parallel on the diodes of the secondary circuit, the controls of these switches being obtained via duality of the primary controls. It is also possible to use bi-directional switches $I_{N,1}$ and $I_{N,2}$.

Figure 3:
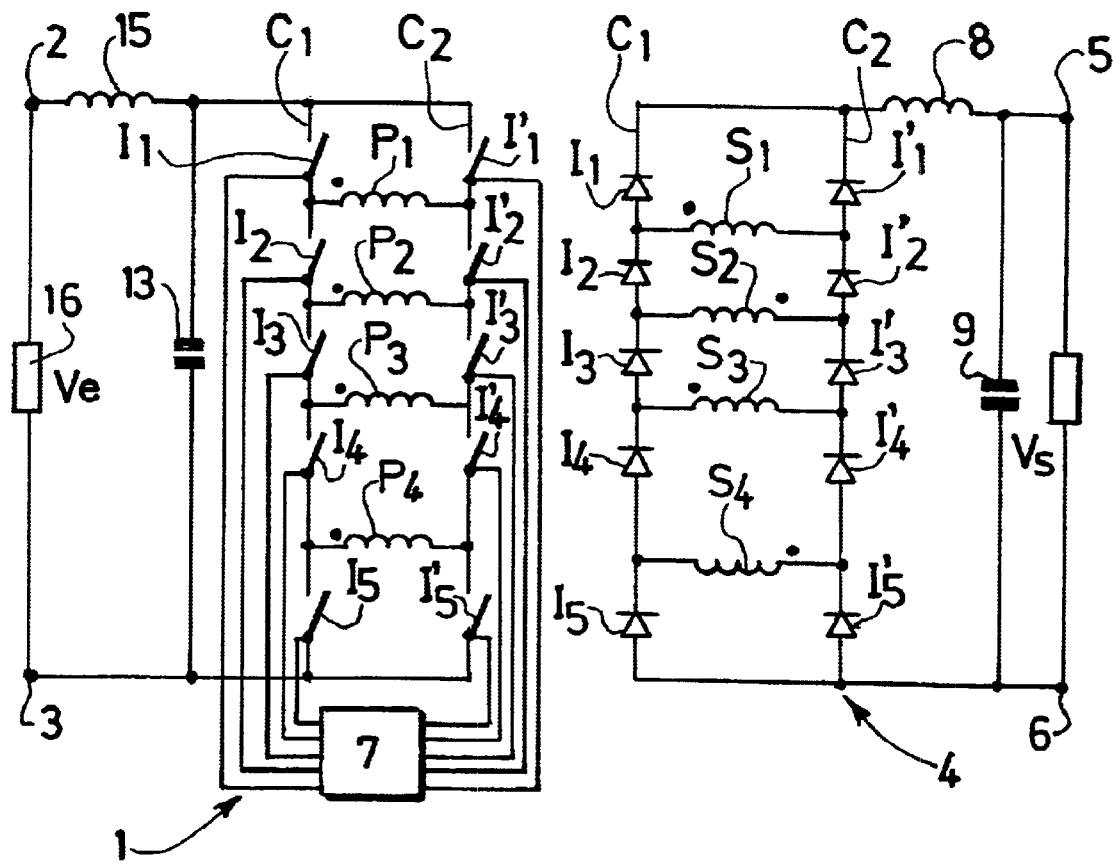
FIG. 3 shows a variant of FIG. 1.

FIG. 3 describes a variant of the embodiment of FIG. 2. On these figures, the same references denote the same components.

In this variant, the primary circuit 1 adopts the first configuration and the secondary circuit 4 adopts the second configuration.

The secondary circuit 4 is identical to the one described for FIG. 1 and the same elements are indicated by the same references.

The two conductors $C_1$, $C_2$ of the secondary circuit are moreover connected to a winding 8 in series and to a capacitor 9 in parallel.

Owing to the presence of a winding 8, the secondary circuit has a current generator The primary circuit 1 is basically identical to the one described for FIG. 1, the same references relating to the same components.

The two conductors $C_1$, $C_2$ of the primary circuit are connected in parallel with a capacitor 13.

The capacitor 13 is connected in series with a winding 15 and a voltage generator 16. The generator is connected between the input terminals 2, 3.

Owing to the presence of the capacitor 13, the primary circuit has a voltage generator.

A third embodiment is described with reference to FIG. 4

In this embodiment, the primary and secondary circuits adopt the second configuration for a number of transformers N=2. Thus, the direction of one of the secondary windings, here $S_2$, is inverted with respect to the direction of the corresponding primary winding $P_2$ and of the other windings $P_1$, $S_1$.

Each switch $I_{N,1}$ and $I_{N,2}$ of the primary circuit 1 is connected in parallel with a diode 17 so as to be able to function bidirectionally.

The switches $I_{N,1}$ and $I_{N,2}$ of the secondary circuit are diodes.

The primary circuit is fed by a voltage generator (VE). The secondary circuit is connected to a current generator (winding 18).

The winding 18 is mounted in series with the positive output terminal 5 and a capacitor 19 is mounted in parallel between the output terminals 5, 6.

The functioning of the various embodiments of the invention is described as indicated below.

The voltage between the input terminals 2, 3 is defined Ve and the voltage between the output terminals 5, 6 is defined Vs.

The functioning of the converter in which the primary and secondary circuits are in the first configuration is now described with reference to FIG. 1.

When the two windings $P_1$ and $P_2$ are in parallel, for example when the switches $I_3$ and $I'_1$ of the primary circuit 1 are open and the other switches closed, if the input terminal 2 is positive, the sides of the windings connected to the terminal 2 are also positive. These sides correspond to the points on FIG. 1.

Via the structure of a transformer, the corresponding sides of the secondary windings $S_1$ and $S_2$ symbolised by the points are also positive which induces circulation of the current in the secondary circuit 4, the secondary windings then being in series.

As the primary windings $P_1$ and $P_2$ are in parallel, the voltage at the level of each winding is equal to Ve. The voltage at the level of each secondary winding $S_1$ and $S_2$ is accordingly also equal to Ve if it is considered that the transformation ratios are equal to 1, hence an output voltage Vs=2 Ve.

When the windings $P_1$ and $P_2$ are in series, for example when the switches $I_1$, $I'_2$ and $I_3$ are closed and the others open, the side of the winding $P_1$ (marked by the point on the figure) connected to the input terminal 2 (positive) is positive, and the side marked by the point of the winding $P_2$ is negative. The voltage at the level of each winding $P_1$, $P_2$ is then equal to Ve/2.

As a result, the side marked by the point of the winding $S_1$ is positive, whereas the side marked by the point of the winding $S_2$ is negative so that only the diodes $I'_1$, $I'_2$, $I_2$, $I_3$ are passing and $S_1$ and $S_2$ are in parallel, the voltage at the level of each winding $S_1$, $S_2$ being equal to Ve/2.

Thus, the output voltage is Vs=Ve/2.

Therefore, for a converter including N transformers having transformation ratios equal to 1, it is possible to make the output voltage Vs vary between Ve/N and N-Ve. The dynamics of the electronic circuit is then $N^2$.

Of course, it is possible that the primary windings $P_1$, $P_2$ are in parallel by opening the switches $I_1$ and $I'_3$ and by closing the other switches. The voltages applied to the terminals are then inverted, thus making it possible to apply an a.c. operating voltage required for the transformers.

With an a.c. input voltage Ve, it is possible to obtain a d.c. output voltage Vs by switching at a suitable frequency the switches of the primary circuit with respect to the variation frequency of the a.c. input voltage. It is then necessary to ensure all the switches of the primary circuit are bi-directional.

This type of assembly has the advantage of being able to be used with a highly variable input voltage (for example between 100 and 1600 volts) and adjusting the output voltage to a fixed value.

The higher the number N of generators, the more the variation range of voltages is increased.

The balancing of the voltages of the transformers is guaranteed, given the fact that when the primary windings are in parallel, the secondary windings are in series and vice versa.

The functioning of the converter in which the primary and secondary circuits are respectively in the first and second configurations are described below with reference to FIG. 2.

The fact that the two configurations are dual with respect to each other means that when the windings $P_1$, $P_2$ of the primary circuit are in parallel, the windings $S_1$, $S_2$ are in series and vice versa.

Thus, when $P_1$ and $P_2$ are in parallel and their side marked by a point is positive, the corresponding side of $S_1$ and $S_2$ is also positive so that only the diodes $I_{1,1}$, $I_3$ are passing and $S_1$, $S_2$ are in series.

If $P_1$ and $P_2$ are in parallel but with an inverted polarity, then $S_1$ and $S_2$ are in series with an inverted polarity, the diodes $I_{1,2}$, $I_{3,1}$ solely being passing.

Similarly as for the preceding converter, it is possible to use at the input a d.c. or a.c. voltage generator and obtain at the output a d.c. voltage.

There now follows a description of the circuit of FIG. 3 in the to case of an a.c. sinusoidal input voltage, as shown on FIG. 5d.

The maximum voltage Ve is defined by Vmax and the input voltages approximately equal to about ⅓ Vmax and ⅔ Vmax respectively by V1 and V2.

It is then possible to cut the curve of the sinusoidal input voltage into several zones:

a zone A corresponding to the voltage range: $0 \leq Ve \leq V1$;
a zone B corresponding to $V1 \leq Ve \leq V2$;
a zone C corresponding to $V2 \leq Ve \leq Vmax$.

When Ve is situated in zone A, the input voltage is then quite low and can be supported by each transformer. The switches $I_N$ and $I'_N$ of the primary circuit are then for example switched so as to associate all the primary windings $P_N$ in parallel, thus associating the secondary windings $S_N$ in series, as shown on FIG. 5a.

Thus, a low voltage Ve is applied to each winding $P_N$, $S_N$ and all the windings $S_N$ are traversed by a given weak current.

When Ve is situated in the zone B, the input voltage is then higher and can no longer be fully supported by each transformer. The switches $I_N$ and $I'_N$ of the primary circuit are then for example, switched so as to associate the primary windings $P_N$ two by two in parallel, resulting in associating the secondary windings $S_N$ in series two by two, as shown on FIG. 5b.

Thus, a voltage Ve/2 is applied to each winding $P_N$, $S_N$ and all the windings $S_N$ are traversed by a current whose intensity has been divided by two.

When Ve is situated in the zone C, the input voltage is even higher and can no longer be fully supported by each transformer. The switches $I_N$ and $I'_N$ of the primary circuit are then, for example, switched so as to associate all the primary windings $P_N$ in series, resulting in associating the secondary windings $S_N$ in parallel, as shown on FIG. 5c.

Thus, a voltage Ve/N is applied to each winding $P_N$, $S_N$ and all the windings $S_N$ are traversed by a current whose intensity has been divided by N.

For a circuit with N transformers, the possibilities of associating the primary windings in parallel and/or in series are much more numerous and make it possible to regulate the output voltage according to use, for example to a fixed value.

Figure 4:
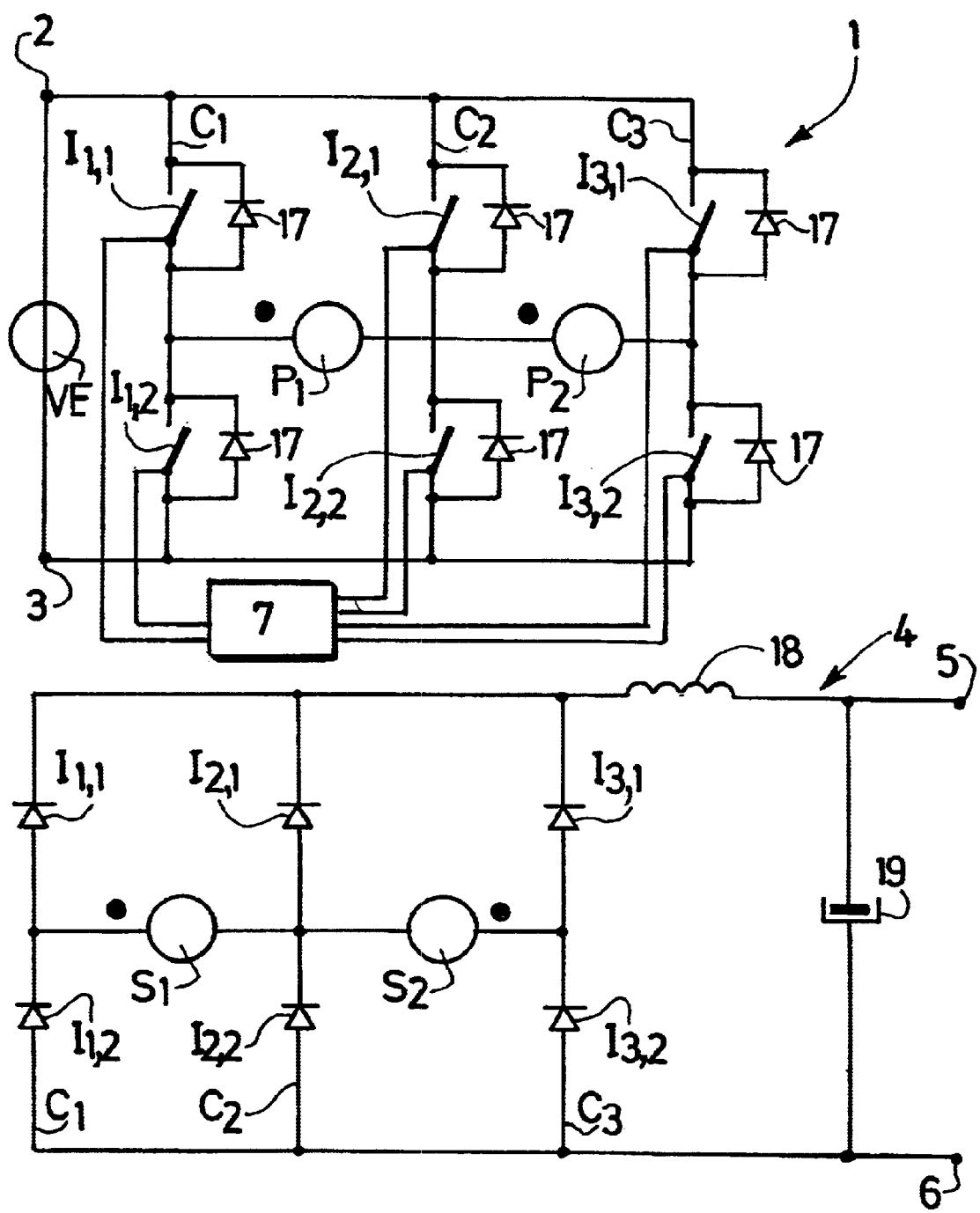
FIG. 4 shows a third embodiment of the invention.

The embodiment shown on FIG. 4 is now described below.

When the primary windings $P_1$, $P_2$ are in parallel, for example when the switches $I_{1,1}$, $I_{3,1}$, $I_{2,2}$ are closed and the others opened, the side of the winding $P_1$ marked by a point is then positive and the side of the winding $P_2$ marked by a point is negative. Thus, the marked sides of a point of the secondary windings $S_1$, $S_2$ are then respectively positive and negative. This polarity means that only the diodes $I_{1,1}$, and $I_{3,2}$ are passing and that the windings $S_1$, $S_2$ are in series.

Figure 7:
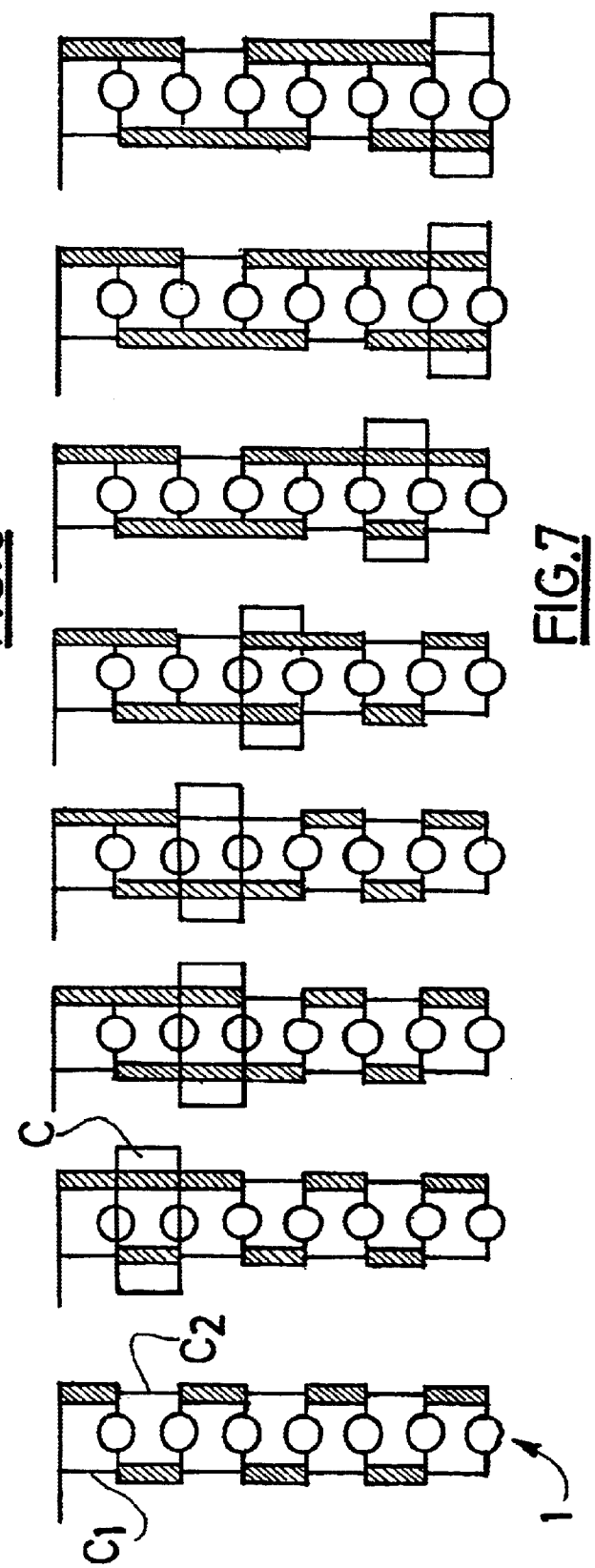

FIGS. 7 and 8 show the conductors $C_1$ and $C_2$ of the primary circuit 1. Only the first seven windings $P_N$ are shown The sections of the conductors $C_1$ and $C_2$ are shown by the thick lines illustrating the switches $I_N$, $I'_N$ closed and the sections shown by the fine lines the switches $I_N$, $I'_N$ open.

A pair of switching means is defined as being formed of two switching means connected after or before a given winding.

The switchings are carried out by degrees by moving a switching pattern symbolised by a frame C along pairs of switching means and by subsequently inverting the state of one or two switching means contained in the frame. In the case of two inversions, these are carried out successively.

Thus, the control means successively control each pair of switching means $I_1$, $I'_1$, then $I_2$, $I'_2$, ..., $I_N$, $I'_N$. In each stage according to the result desired, the switching element $I_N$ is inverted or not inverted, and then the switching element $I'_N$ is inverted or not inverted.

This method makes it possible for example to invert the polarity of the primary circuit or to invert the polarity of the voltage at the terminals of each transformer.

Figure 6:
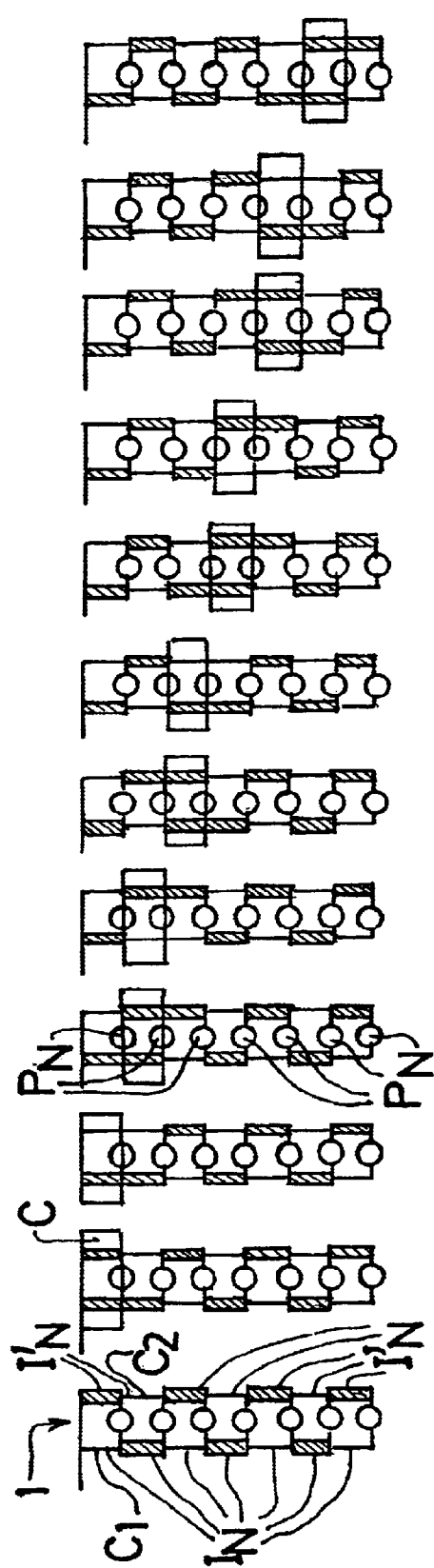
FIGS. 6 and 7 illustrate two switching modes of a converter according to the invention

The example shown on FIG. 6 corresponds to inversion of the polarity of the primary windings which are in a configuration where all the primary windings $P_N$ are in series. The polarity inversion is obtained by inverting all the switches.

In the example shown on FIG. 7, the switching means are switched so as to pass from a configuration where all the switching means $I_N$, $I'_N$ are in series to a configuration where the switching means are in parallel two by two.

This control method has the following advantages:

the switching of the switches is almost "soft": the dynamic losses are in fact divided by about four;

a single switch switches at one and the same time, which simplifies implementation and thus there are no problems linked to the simultaneous switching of semiconductors in series;

the apparent frequency seen from the primary is extremely high;

the amplitude of undulation at the terminals of the primary after the input self-inducting coil is extremely low which makes it possible to reduce the size of the input self-inducting coil;

adjustment of the input current is facilitated as the response time of adjustment is extremely short.

Furthermore, as the current is circulating continuously in the circuit of the invention, the input and output filters of the circuit shall be less stressed than in a conventional circuit having a significant pulsating current.

The converter of the invention has the advantage of being tolerant to a simple breakdown: irrespective of the breakdown mode of a switch of a transformer, it is possible to function in degraded mode.

Then the failed stage is isolated by applying a suitable command to the switches. This has the result of limiting the capacities of the entire circuit (the variation range of the voltages is reduced) without stopping the latter from functioning;

Furthermore, a primary circuit adopting the first configuration is well-adapted for high voltages as the switches share the voltage between them. A secondary circuit adopting the second configuration is well-adapted for high output currents as the switches share the output current.

The electronic circuit of the invention has a vast sphere in application in electronics.

The invention is not limited to the embodiments described and in particular the value of N used, which can be extremely variable.

In particular, it is possible to envisage all the associations in parallel and/or in series of the primary and/or secondary windings of the transformers without departing from the context of the invention.

All of part of the elements of the electronic circuit can moreover be controlled by a computer so as to obtain the desired association of the transformers.

Below is a description of two particular applications of the invention.

In a first application of the electronic circuit of the invention, this circuit replaces the energy converter placed in a railway vehicle fed either by a d.c. voltage of 1500V or 3000V or by an a.c. voltage of 1000V or 1500V, said converter being able to transform this voltage into a voltage able to feed the electric elements embarked in this vehicle.

By using an electronic circuit according to the invention instead of known energy converters, it is then possible to remove the input filter.

In fact, in known embodiments, the standard UIC 550 (International Union of Railways) requires the use of a heavy bulky input filter made up of a capacitor and an inductive resistor.

By means of the electronic circuit of the invention, it is possible to remove said bulky filter whilst observing the standards and thus obtain a considerable gain of weight.

The input generator then becomes a current generator.

The method for controlling the switches regulates a constant current compatible with the standard UIC 550, thus creating a high input impedance.

Below 50 Hz, the current control point is adapted so as to adjust the output voltage.

Another application of the converter is using it as a converter to provide the function for pulling a railway vehicle fed by an a.c. voltage of 15000V or 25000V, said converter being able to transform this voltage into a voltage able to feed the electric elements embarked on said vehicle. Said electric converter then has no low frequency (50 Hz or 16.7 Hz) high voltage input transformer.

The converter of the invention can be used in a large number of fields:

rail traction: the input transformer and its rectifier currently reaching 13 tons whereas a converter according to the invention would reach only 3 tons;

average power applications on various mains voltages with a converter according to the invention, it is no longer necessary to modify the equipment and merely suffices to modify the control method;

constant power and variable output voltage power feeds.

What is claimed is:

1. An electric energy converter, comprising:

two input terminals;

two output terminals;

N transformers each including a primary winding and a secondary winding;

a primary circuit connected to the two input terminals on which the primary windings of the transformers are connected;

a secondary circuit connected to the two output terminals on which the secondary windings of the transformers are connected, wherein each primary and secondary circuit of the converter includes a set of switching devices connected to N primary windings and N secondary windings; and a controller configured to control the switching devices of at least one of the primary or secondary circuits and thereby select an arrangement of the N primary or secondary windings, the switching devices being connected to associate the N primary or secondary windings in a selected one of a serial arrangements, a parallel arrangement, and a serial and parallel combination arrangement by using the controller.

2. The converter according to claim 1, wherein the first circuit includes a current generator which feeds the input terminals and the secondary circuit includes a voltage generator connected in parallel to the output terminals.

3. The converter according to claim 1, wherein the primary circuit includes a generator connected in parallel to the input terminals and wherein the secondary circuit includes a current generator connected to the output terminals.

4. The converter according to claim 1, wherein each primary or secondary circuit can adopt one of two dual configurations, wherein:

a first configuration includes two electric conductors connected in parallel between the input or output terminals, each conductor comprising at least N+1 switching devices in series, the two conductors being interconnected between their respective switching devices by a primary or secondary winding, and a second configuration includes N+1 electric conductors connected in parallel between the input or output terminals, each conductor comprising at least two switching devices in series, the conductors being interconnected two by two between their respective switching devices by a primary or secondary winding.

5. The converter according to claim 4, wherein, when the primary and secondary circuits have the same configuration, one winding out of two of the secondary circuit being inverted with respect to the corresponding winding of the primary circuit, wherein remaining windings are wound in the same direction.

6. The converter according to claim 4, wherein when the primary and secondary circuits have different configurations, all windings are in the same direction.

7. The converter according to claim 1, wherein the switching devices of at least one of the secondary circuit and the primary circuit are unidirectional or bidirectional switches.

8. The converter according to claim 1, wherein the controller controls the switching devices of the primary circuit and of the secondary circuit, said switches being controlled both at the primary circuit and the secondary circuit.

9. The converter according to claim 4, further comprising:

a primary circuit adopting the first configuration, the two conductors of the primary circuit being in parallel with a capacitor;

a winding in series with the capacitor;

a voltage generator connected between the input terminals;

a secondary circuit adopting the first configuration whose two conductors are in series with a winding and in parallel with a capacitor;

the switching device of the secondary circuit being diodes.

10. The converter according to claim 4, further comprising:

a primary circuit adopting the second configuration in which the switching device includes unidirectional switches each in parallel with one diode:

a secondary circuit adopting the second configuration in which the switching device includes diodes;

a capacitor in parallel with the output terminals;

a winding in series with one of the output terminals.

11. The converter according to claim 1 wherein the converter is located in a rail vehicle and fed by one of a d.c. voltage of 1500V, a d.c. voltage of 3000V, an a.c. voltage of 1000V, and an a.c. voltage of 1500V, said converter configured to transform the voltage into a voltage configured for electric elements embarked on said vehicle, wherein said electric converter has no input filter.

12. The converter according to claim 1, wherein the converter is configured for providing a function of pulling a rail vehicle and configured to receive an a.c. voltage of 15000V or 25000V, said converter configured to transform said voltage into a voltage configured for electric elements embarked on said vehicle, wherein said electric converter has no high input voltage low frequency transformer.

13. A method for controlling a converter having input and output terminals, N transformers each including a primary winding and a secondary winding, a primary circuit connected to the input terminals on which the primary windings are connected, a secondary circuit connected to the output terminals on which the secondary windings are connected, wherein each primary and secondary circuit of the converter includes switching devices connected to N primary windings and N secondary windings, and a controller to control the switching device of at least one of the primary or secondary circuits and thereby select an arrangement of the N primary or secondary windings, the switching devices being connected to associate the N primary or secondary windings in a selected one of a serial arrangement, a parallel arrangement, and a serial and parallel combination arrangement by using the control means, comprising:

moving a switching pattern successively along pairs of switching devices of the primary circuit; and for each pair of switching devices, inverting a state of at least one of the switching devices.

* * * * *

UNITED STATES PATENT AND TRADEMARK OFFICE
CERTIFICATE OF CORRECTION

PATENT NO. : 6,654,266 B2 Page 1 of 1
DATED : November 25, 2003
INVENTOR(S) : Gerard Kalvelage and Philippe Aubin It is certified that error appears in the above-identified patent and that said Letters Patent is hereby corrected as shown below:

Column 9,
Line 23, "arrangements" should be -- arrangement --

Signed and Sealed this

Eleventh Day of January, 2005

JON W. DUDAS
*Director of the United States Patent and Trademark Office*